United States Patent
Amon et al.

(10) Patent No.: US 8,559,502 B2
(45) Date of Patent: Oct. 15, 2013

(54) METHOD AND DEVICE FOR MINIMIZING A QUANTIZATION ERROR

(75) Inventors: Peter Amon, München (DE); Michael Kapralov, Stanford, CA (US)

(73) Assignee: Siemens Aktiengesellschaft, Munich (DE)

(*) Notice: Subject to any disclaimer, the term of this patent is extended or adjusted under 35 U.S.C. 154(b) by 1292 days.

(21) Appl. No.: 11/918,399

(22) PCT Filed: Apr. 4, 2006

(86) PCT No.: PCT/EP2006/061312
§ 371 (c)(1),
(2), (4) Date: Oct. 31, 2008

(87) PCT Pub. No.: WO2006/108780
PCT Pub. Date: Oct. 19, 2006

(65) Prior Publication Data
US 2009/0067492 A1    Mar. 12, 2009

(30) Foreign Application Priority Data

Apr. 12, 2005  (DE) .......................... 10 2005 016 858

(51) Int. Cl.
*H04B 1/66* (2006.01)
(52) U.S. Cl.
USPC ............. 375/240.03; 375/240.12; 375/240.27
(58) Field of Classification Search
USPC ............. 375/240.03, 240.12, 240.13, 240.24, 375/240.27, E7.139, E7.152, 240.29
See application file for complete search history.

(56) References Cited

U.S. PATENT DOCUMENTS

| | | | |
|---|---|---|---|
| 6,414,992 B1* | 7/2002 | Sriram et al. | 375/240.13 |
| 2002/0176495 A1* | 11/2002 | Vetro et al. | 375/240.02 |
| 2004/0190610 A1* | 9/2004 | Song et al. | 375/240.03 |
| 2005/0078748 A1* | 4/2005 | Moni et al. | 375/240.03 |
| 2006/0257037 A1* | 11/2006 | Samadani | 382/251 |

FOREIGN PATENT DOCUMENTS

| | | |
|---|---|---|
| JP | 62-216425 | 9/1987 |
| JP | 6-29934 | 2/1994 |
| WO | WO-2005/079077 A1 * | 8/2005 |

OTHER PUBLICATIONS

ITU-T und ISO/IEC JTC1, "JSVM 1 Software", JVT-N024, Jan. 2005.
Kwang-Deok Seo et al. "Laplacian Model-based inverse Quantization for DCT-based image codec system", Circuits and Systems 2004, IEEE, pp. 881-884.

(Continued)

*Primary Examiner* — Eleni Shiferaw
*Assistant Examiner* — Hilary Branske
(74) *Attorney, Agent, or Firm* — Staas & Halsey LLP

(57) ABSTRACT

A device minimizes a quantization error in the inverse quantization of a quantized coefficient during a compression method, the quantization error describing a difference between the quantized coefficient after inverse quantization and an associated coefficient prior to quantization. According to the method, at least one parameter that is characteristic of the compression of the quantized coefficient is selected, (at least two characteristic parameters being selected if one of the two characteristic parameters corresponds to a temporal prediction mode), a correction value is chosen based on the selected characteristic parameter(s) and inverse quantization takes place after the correction value has been added to the quantized coefficient.

17 Claims, 7 Drawing Sheets

(56) References Cited

OTHER PUBLICATIONS

H. Sorial et al. "Estimating Laplacian Parameters of DCT Coefficients for requantization in the transcoding of MPEG-2 video", Image Processing, Sep. 10, 2003, IEEE, pp. 956-959.

Yun Q. Shi et al. "Image and video compression for multimedia engineering", (Fundamentals, Algorithms, and Standards), CRC-Press 2000.

J.R. Price et al. "Biased Reconstruction for JPEG Decoding", IEEE Signal Processing Letters, vol. 6 No. 12, Dec. 1999, pp. 297-299.

E. Schrüfer "Signalverarbeitung—Numerische Verarbeitung digitaler Signale", 1992, Hanser-Verlag München, vol. 2, Prof. Dr. Elmar Schrüfer (TU München—Lehrstuhl für Elektrische Messtechnik), pp. 72-146, Chapter 3: Ausgleichsrechnug, Chapter 4: "Numerisches Glätten, Differenzieren und Integrieren."

International Search Report issued in corresponding International Patent Application No. PCT/EP2006/061312.

Japanese Office Action for related Japanese Patent Application No. 2008-505863, issued on Feb. 17, 2012.

\* cited by examiner

METHOD AND DEVICE FOR MINIMIZING A QUANTIZATION ERROR

CROSS REFERENCE TO RELATE APPLICATIONS

This application is based on and hereby claims priority to International German Application No. 10 2005 016 858.2 filed on Apr. 12, 2005, the contents of which are hereby incorporated by reference.

BACKGROUND

When compressing information a distinction is made between lossless and lossy compression techniques. With lossless compression techniques, such as Lempel-Ziv coding or Huffman coding, the original, non-compressed information can be reconstructed from compressed information without errors. Methods of this kind only achieve a high compression rate if the information for compressing comprises specific structures. By contrast high compression rates can be achieved with lossy compression techniques, such as the JPEG method (JPEG-Joint Picture Expert Group), the MPEG2 method (MPEG-Motion Picture Expert Group) or the MC method (MC-Adaptive Audio Coding). However it has to be accepted in this connection that the original, non-compressed information cannot be recovered from the compressed information error free. The errors in the decompressed information often increases as the compression rate increases. Thus with the image compression method JPEG for example, block artifacts can be seen within the decompressed image.

FIG. 1 exemplarily shows a simplified encoding unit of a JPEG encoder JC. In this connection an image IM for compressing is divided into image blocks BB with, for example, 8×8 pixels. Further processing within the JPEG encoder JC is based on these image blocks. Each image block is firstly transformed by the discrete cosine transformation FDCT into the frequency. The coefficients X are produced in the process. Each coefficient X is subjected to a quantization FQ, the quantization, i.e. the quantization factor Q, being controlled by the first table TS1. The quantized coefficient Z is generated hereby. Entropy coding then takes place, for example Huffman coding, by an entropy encoder EC which is controlled with the aid of a second table TS2. Coded image data is written into a file JDS at the outcome of entropy coding.

FIG. 2 shows by way of example a simplified illustration of a decoding unit of a JPEG decoder JD. The encoded image data is read from the file JDS and supplied to the entropy decoder ED for entropy decoding. The entropy decoder ED is controlled by the second table TS2. The quantized coefficients Z are available at the output of the entropy decoder. These are then inversely quantized by an inverse quantization module FIQ, the first table TS1 controlling the inverse quantization. The inverse quantization module FIQ provides reconstructed coefficients Y. These are finally transformed by the inverse discrete cosine transformation IDCT from the frequency domain to the space domain and stored in the reconstructed image IM' at the appropriate local position.

Quantization is a method that is frequently used within lossy compression techniques. The function of quantization can be illustrated using the following equation:

$$Z = \left[\frac{X}{Q}\right] \quad (1)$$

where X is the unquantized value or coefficient, Z the quantized value or quantized coefficient and Q the quantization factor. The brackets [ ] in equation (1) denote that all decimal places are deleted, i.e. equation (1) describes a division with an integral calculation result.

If for example the coefficients X are illustrated by 8 bits, the coefficient X can assume a value in the number range from 0 to 255. A value in the number range of the quantized coefficients Z is reduced by quantization as a function of the quantization factor Q. If for example the quantization factor Q=8 and the equation (1) is used to calculate the quantized coefficients, the quantized coefficients Z can only assume a numerical value from 0 to 15. Larger quantization factors Q increase the compression rate.

The following second equation can be used to reconstruct the original unquantized coefficient X:

$$Y = Z^* Q \quad (2),$$

this equation corresponding to an inverse quantization and the reference character Y representing the reconstructed value or reconstructed coefficient.

By deleting the decimal points in equation (1) information is lost, so the reconstructed coefficient Y frequently does not match the coefficient X, i.e. Y•X. A first quantization error QF1 results in this case which, for example, can be numerically determined by the following equation:

$$QF1 = (X - Y)^2 = (X - Q^*Z)^2 = \left(X - Q^*\left[\frac{X}{Q}\right]\right)^2 \quad (3)$$

Equation (3) is only one possible type of calculation for the first quantization error QF1. Reference is made by way of example to the literature Shi and Sun, "Image and video compression for multimedia engineering", CRC-Press, 2000 Chapter 2.2.1.2 for further executions.

To reduce the first quantization error QF1 a correction value can be introduced within the inverse quantization. Two examples are illustrated in more detail in this regard. The quantization error is reduced by the equation $$Y = \left(Z + \frac{1}{2}\right)*Q \quad (4)$$

However, equation (4) provides a lower quantization error only for uniformly distributed coefficients X within the quantization interval determined by the quantization factor Q. With non-uniformly distributed coefficients X equation (4) does not supply a minimal quantization error.

A second example is described by the equation $$Y = (Z + KW)^* Q \quad (5)$$

An adjustment to non-uniformly distributed coefficients X is achieved in this connection by a correction value KW. It is for example known from video encoding software, which is provided with document ITU-T and ISO/IEC JTC1, "JSVM 1 Software", JVT-N024, January 2005, to definitely set the correction value KW=⅓ for INTRA and INTER-encoded coefficients X and the correction value KW=⅙ for RESIDUAL-encoded coefficients X. The term RESIDUAL encoding should be understood for example as bidirectional encoding.

SUMMARY

One potential object is to disclose a method and a device which, compared with the prior art, easily reduce a quantization error in a compression method.

The inventors propose a method for reducing a quantization error in an inverse quantization of a quantized coefficient during a compression method, the quantization error describing a difference between the quantized coefficient after inverse quantization and an associated coefficient before quantization. At least one parameter that is characteristic of the compression of the quantized coefficient is selected, at least two characteristic parameters being selected if one of the two characteristic parameters corresponds to a temporal prediction mode, a correction value is selected as a function of the at least one selected characteristic parameter, and the inverse quantization takes place after the correction value has been added to the quantized coefficient.

By using at least one characteristic parameter to select the correction value, an optimum correction value can be found which takes into consideration the statistical properties of the at least one characteristic parameter with respect to the quantized coefficients and therefore produces a lower quantization error than without this consideration. By considering a plurality of characteristic parameters a respective optimum correction value, which for a quantized coefficient that is encoded by these characteristic parameters produces a very low quantization error, can also be found. In general the quantization error decreases as the considered characteristic parameters increases. The optimum correction value(s) can also be determined offline, so as the compression method is being carried out a low degree of processing effort is required to select the correction value. In this connection offline means that optimum correction values are determined for one or more characteristic parameter(s) using one or more test sequence(s). These determined, optimum correction values can then be used in the inverse quantization of the quantized coefficient to quickly determine the correction value. The low degree of processing effort is very advantageous particularly with small devices, such as mobile phones, since these involve low power consumption.

A quantization factor, a block size of a block, a block containing a plurality of quantized coefficients and this block with the block size comprising the quantized coefficient, at least one frequency value, the quantized coefficient representing an amplitude of the at least one frequency value, and/or the temporal prediction mode, in particular an INTRA prediction mode, an INTER prediction mode and/or a RESIDUAL prediction mode, are preferably taken into consideration as the characteristic parameter of the quantized coefficient. Correction values can be optimally adapted to encoding properties of the quantized coefficient by using one or more of these characteristic parameter(s).

In an alternative embodiment an estimator is produced as a function of at least one characteristic parameter for at least one correction value, in particular on the basis of at least one test sequence, and the correction value is determined in the compression method by the estimator. Simplification in the selection of the correction value is achieved hereby since the correction value can be taken from the estimator. Different estimators are also used for at least two characteristic parameters, so each estimator can be more exactly adapted to the statistical properties of the characteristic parameters used. A Laplace function has turned out to be good as an estimator in video encoding since this efficiently approximates the distribution of the quantized coefficients.

If, moreover, the correction value is determined using a method different to the estimator, by using an estimator an estimate is generated for the correction value, a differential is produced from correction value and estimate, and the produced differential is transmitted from an encoding device of the compression method to a decoding device of the compression method, so a data set, which is to be transmitted, for signaling the correction value is kept low since only differentials are transmitted.

A plurality of correction values or differentials are preferably transmitted from an encoding device of the compression method to a decoding device of the compression method. In the process it is not just one correction value that is assigned to a characteristic parameter, rather an optimum correction value can be selected as a function of the value of the characteristic parameter.

If, moreover, a piece-wise linearization of the correction values and/or differentials is carried out before transmission and as a function of the at least one characteristic parameter, the data set to be transmitted can therefore be further reduced for the correction value and differentials.

A correction value is preferably determined on the basis of the selection of at least one characteristic parameter in such a way that the quantization error of a coefficient group of quantized coefficients is minimized by the characteristic parameters of the selection, the respective inverse quantization taking place after the correction value has been added to the quantized coefficient of the coefficient group. A virtually optimal correction value may be determined with this expansion. If, moreover, a coefficient group is recreated at an instant, this instant being determined by strictly predefined instants or by a plurality of already quantized coefficients, the correction value for a coefficient group can be adapted as a function of already-processed, quantized coefficients and the quantization error is further reduced thereby.

A video encoding method, in particular to the H.264 standard, is preferably selected as the compression method since it is precisely with the video encoding method that application of the method described can achieve a clear improvement in image quality.

The coefficient group of the quantized coefficients is also taken from at least one image block or at least one group of image blocks or at least one image. A coefficient group and the associated optimum correction value can consequently be determined for the encoding structures, predefined by the compression method, for example video encoding method, and a respective quantization error can be kept to a minimum.

The inventors also propose a device for reducing a quantization error in an inverse quantization of a quantized coefficient during a compression method, the quantization error describing a difference between the quantized coefficient after inverse quantization and an associated coefficient before quantization, in which device a correction value unit which is configured in such a way that at least one parameter that is characteristic of the compression of the quantized coefficient is selected, at least two characteristic parameters being selected if one of the two characteristic parameters corresponds to a temporal prediction mode, a correction value (KW) being selected as a function of the at least one selected characteristic parameter and inverse quantization taking place after the correction value has been added to the quantized coefficient. The device makes it possible to implement and carry out the method.

The device is preferably equipped with a correction value analysis unit which is configured in such a way that on the basis of the selection of at least one characteristic parameter a correction value is determined in such a way that the quantization error of a coefficient group of quantized coefficients is minimized by the characteristic parameters of the selection, the respective inverse quantization taking place after the correction value has been added to the quantized coefficient of the coefficient group. By using the correction value analysis unit a minimum correction value is attained by formation of a coefficient group, the quantized coefficients of the coefficient group having been encoded with the same characters parameters as the quantized coefficient should be determined for the optimum correction value. Formation of the coefficient group means that one or more correction value(s) are generated which constitute the optimum correction values for all quantized coefficients within the coefficient group.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
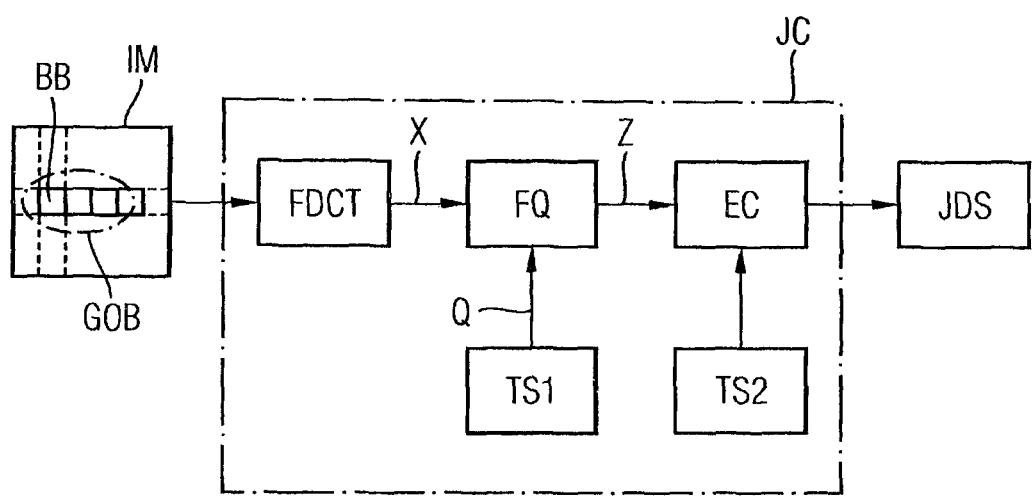
FIG. 1 shows a schematic construction of a JPEG encoder of the related art.

Reference will now be made in detail to the preferred embodiments of the present invention, examples of which are illustrated in the accompanying drawings, wherein like reference numerals refer to like elements throughout.

Figure 2:
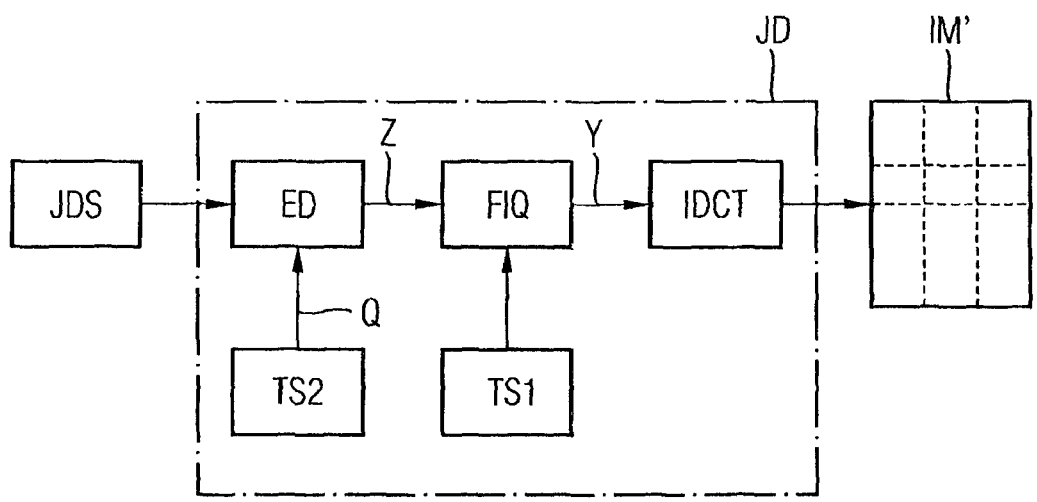
FIG. 2 shows a schematic construction of a JPEG decoder of the related art.

FIGS. 1 and 2 have been acknowledged in detail in the introduction, so they will not be discussed further at this point.

Figure 3:
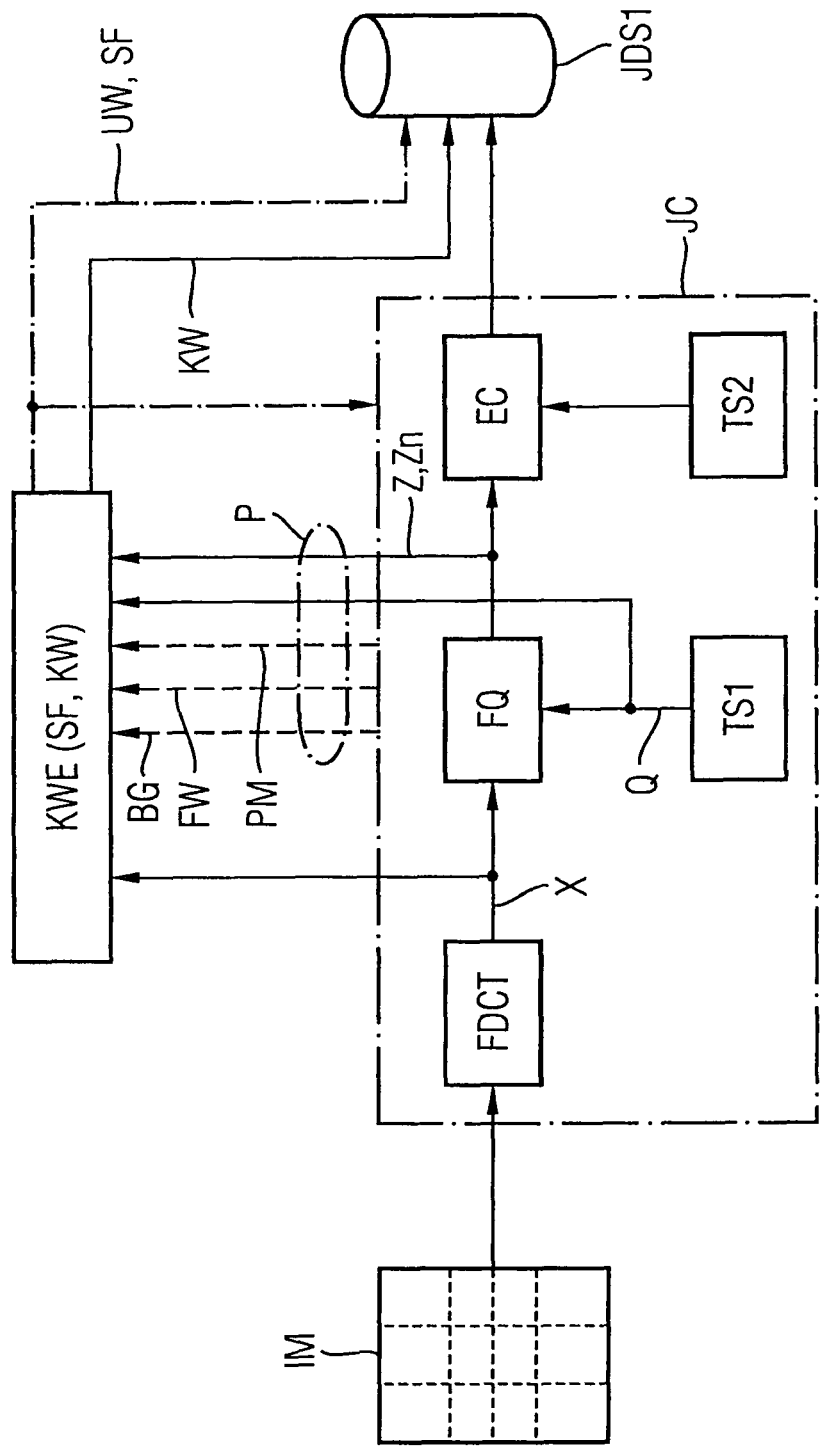
FIG. 3 shows a modified construction of a JPEG encoder for generating correction values for the proposed method.

The method will be described in more detail with the aid of FIGS. 3 and 5. FIG. 3 is based on FIG. 1, having been supplemented by a correction value unit KWE. In FIG. 3 compressed data is generated from an image IM, which data is stored in a first file JDS1. In the quantization with the quantization factor Q a quantized coefficient is generated for each coefficient X. In the process the quantization factor Q, the coefficients X and the quantized coefficients Z are fed to the correction value unit KWE as the set of coefficients. The correction value unit KWE stores for example a first quantization error QF1 which is produced from $QF1=(X-Z*Q)^2$. Furthermore, the quantization factor Q used in the process is stored for each first quantization error QF1. The following table shows this by way of example using five sets of coefficients, these sets of coefficients being numbered with a number from to 1 to 5:

| No. | X | Z | Q | QF1 | KW | Y |
|---|---|---|---|---|---|---|
| 1 | 100 | 12 | 8 | 16 | 5/16 | 98.5 |
| 2 | 117 | 23 | 5 | 4 | 2/5 | 117 |
| 3 | 37 | 7 | 5 | 4 | 2/5 | 37 |
| 4 | 47 | 15 | 3 | 4 | 2/3 | 47 |
| 5 | 105 | 13 | 8 | 1 | 5/16 | 106.5 |

If for example the coefficient is X=100 and the quantization factor is Q=8, this produces the quantized coefficient Z=12 and the first quantization error QF1=16. The correction value unit KWE determines a correction value KW hereinafter which minimizes a quantization error QF after inverse quantization by using equation (5). If the correction value KW is taken into consideration during calculation, a quantization error QF is produced:

$$QF=(X-Y)^2=(X-Q*(Z+KW))^2=(X-Q*Z-KW*Q)^2 \quad (6)$$

To determine the optimum correction value KW equation (6) is minimized as a function of the correction value, for example derived after the correction value KW, and set to zero, i.e.

$$QF'=2*(X-Q*Z-KW*Q)*(-Q)=$$
$$2*(\sqrt{QF1}-Q*KW)*(-Q)=0 \quad (7)$$

If the quantization error QF for the correction value KW is determined for more than one set of coefficients, the derived quantization errors QF' of the respective sets of coefficients are added together and the result of addition set to zero. The quantized coefficients which are considered in this calculation are combined in a coefficient group G. The quantized coefficients of the coefficient group G are designated by the reference character Zn. By using equation (7) the optimum correction value is KW=2.3 for example for the fourth set of coefficients with the quantization factor Q=3. For the first and fifth sets of coefficients with the quantization factor Q=8, the common optimum correction value is KW=5/16. The optimum correction values KW have been entered into the above table. The determined optimum correction values KW are stored for example in the first file JDS1. This/these correction value(s) KW are designated optimum since they achieve the minimum quantization error QF according to equation (7). The method and device are not restricted to the use of equations (7) and (8) to determine the optimum correction value(s) KW, instead any optimization method, such as the testing of different correction values KW, can be used for this purpose. Different optimization methods may also be used for generating the correction values KW for each quantization stage Q. This analogously applies to the case where characteristic parameters P other than the quantization stage Q are used.

In an alternative embodiment an optimum correction value KW can be determined for all quantization factors Q in which the derived quantization error QF' of the respective sets of coefficients are added together and the result is set at zero. For the above exemplary embodiment the correction value is KW=6/17.

Figure 4:
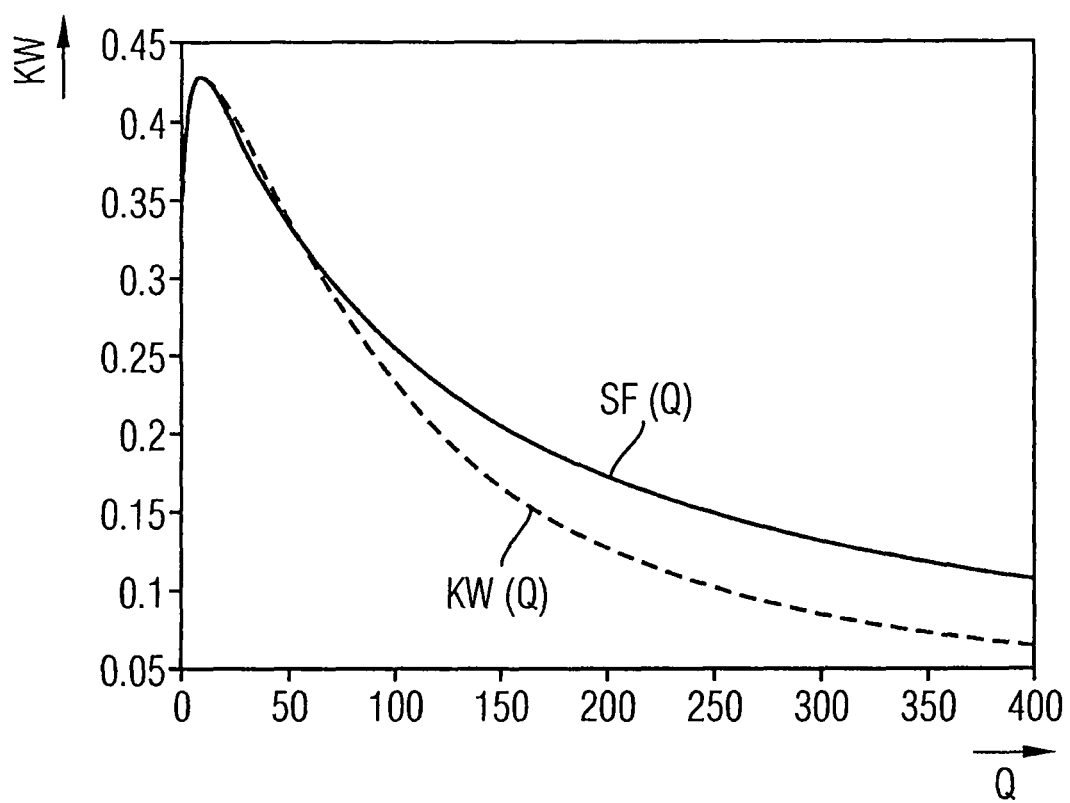
FIG. 4 shows a diagram of optimized correction values as a function of quantization stages.

In FIG. 4 a function of optimum correction values KW is plotted by way of example over the quantization factor Q. This function is designated by the reference character KW(Q) in FIG. 4.

Figure 5:
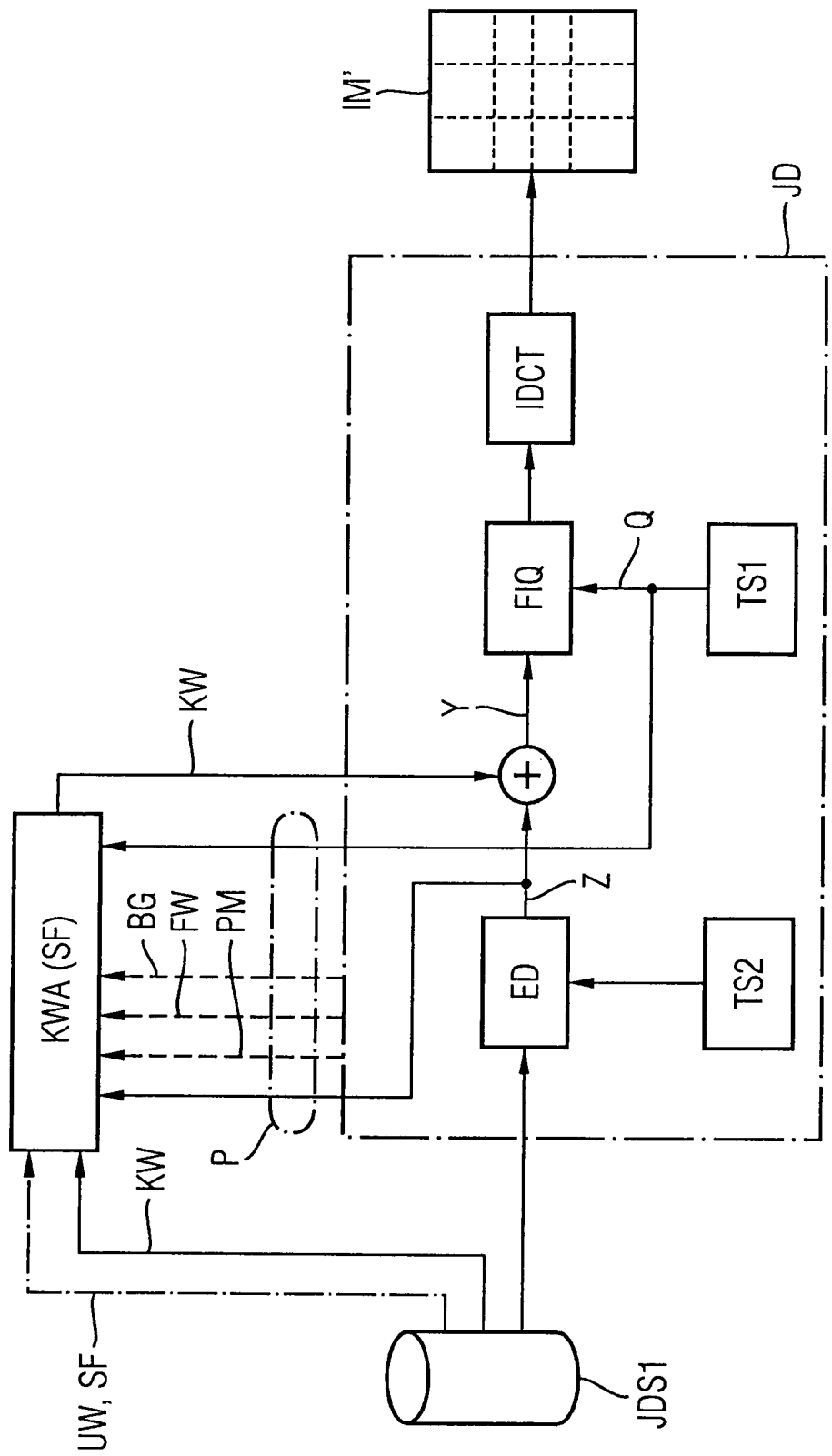
FIG. 5 shows a modified construction of a JPEG decoder for carrying out the proposed method by taking into consideration correction values.

A decoding unit can be seen in FIG. 5 which is based on the decoding unit of FIG. 2 In this case, in addition to FIG. 2, one or more correction value(s) KW are read from the first data JDS1 during decoding of the encoded image data, for example by way of a correction value analysis unit KWA.

Before inverse quantization by the inverse quantization module FIQ the associated correction value KW is added to the quantized coefficient Z. Inverse quantization then takes place. In an alternative embodiment the value KW*Q can only be added to the reconstructed coefficient Y after inverse quantization. The reconstructed coefficient Y=Z*Q+KW*Q is thus produced. The coefficients Y reconstructed using the optimum correction values KW have been incorporated in the above table.

In the examples according to FIGS. 3 and 5 the optimum correction values KW have been determined by considering the respective quantization factor Q. This is based on the underlying recognition that a frequency distribution of the coefficients X can be changed depending on the quantization factor Q, and therefore a minimum quantization error QF can be attained by a correction value KW associated with each quantization factor Q. The quantization factor Q merely constitutes one of the possible characteristic parameters P which can be considered when determining the optimum correction value(s) KW. Alternatively, for example the quantized coefficient Z is considered as the characteristic parameter P instead of the quantization factor Q. A respective coefficient group G can be formed for one or more quantized coefficient(s) Z and an optimum correction value KW generated for each coefficient group G. The quantized coefficients Z in the value range from 0 to 9 and in the range from 10 to 20 are divided for example into two separate coefficients groups G and an optimum correction value KW is calculated for each coefficient group G.

Figure 6:
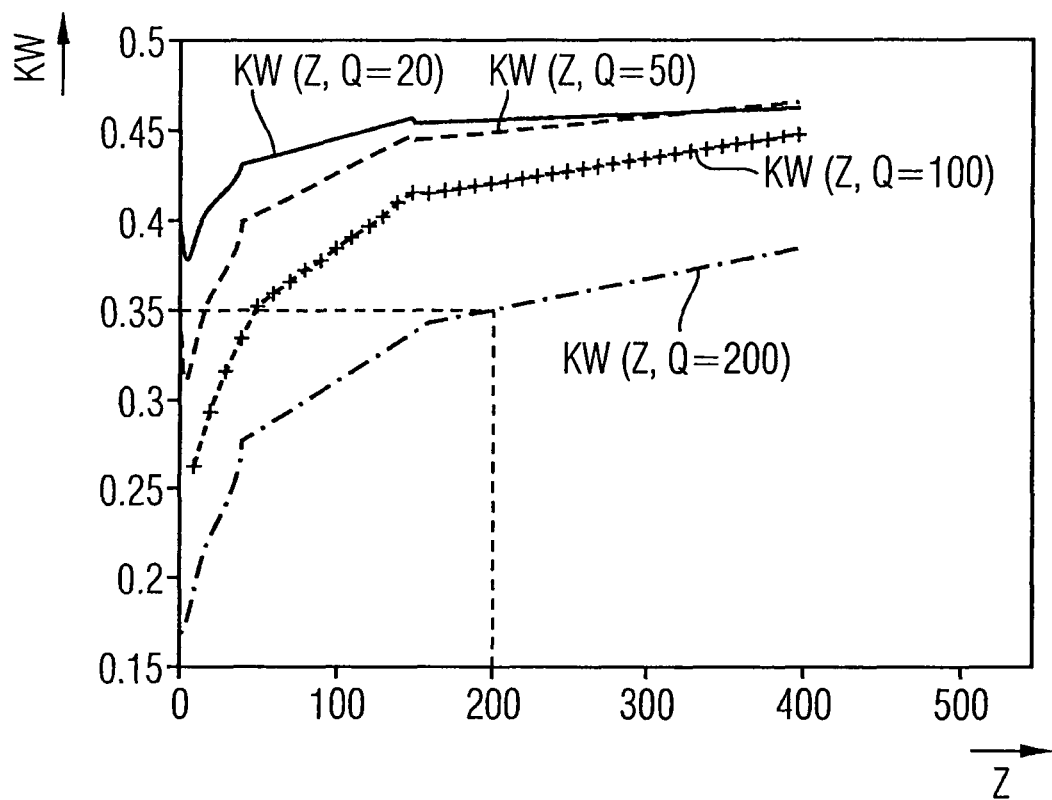
FIG. 6 shows a graph of optimum correction values as a function of quantized coefficients and quantization factors.

In a further variant of the method at least two characteristic parameters P are used to form the coefficient group G and therefore to determine the optimum correction value(s) KW. In FIG. 6 a function of optimum correction values KW has been determined respectively as a function of the quantized coefficient Z for the quantization factors Q=20, Q=50, Q=100 and Q=200. A function of this kind is designated KW(Z, Q=200) by way of example in FIG. 6, this expression indicating that with a quantization factor Q=200 the optimum correction value KW can be read from this function depending on the quantized coefficient Z. The optimum correction value KW therefore results for the quantization factor Q=200 and the quantized coefficient Z=200 as KW=KW(Z=200, Q=200). When using a plurality of characteristic parameters P a Lagrange method for example can be used for determining the optimum correction value KW.

The method is used for example in a video encoding method. In this case the following characteristic parameters P can be used in addition to and/or instead of the quantization factor Q and/or the quantized coefficient Z to determine the optimum correction value KW:

Block Size BG:

In block-based video encoding methods image data is divided into image blocks with a block size BG of for example 4×4, 8×8 or 16×16 pixels. An optimum correction value KW can be found for the quantized coefficient Z as a function of the block size BG of the image block BB in which the quantized coefficient Z is located.

Frequency Value FW:

In a block-based compression method, such as JPEG or H.264, image blocks 8×8 pixels large are transformed from the space domain into the frequency domain or from the frequency domain into the space domain. In FIG. 1 this is brought about by the discrete cosine transformation FDCT or the inverse cosine transformation IDCT. In this case each coefficient X, and therefore the associated quantized coefficient Z within the transformed image block as well, represents a specific two-dimensional frequency value KW, the amplitude of the frequency value FW corresponding to the coefficient X. An associated optimum correction value KW is therefore created for example for each frequency value FW. A group G of quantized coefficients Z can also be formed from a plurality of frequency values FW. A separate optimum correction value KW respectively is therefore produced for example for the frequency value FW with a constant component DC and for all other frequency values FW, i.e. for the non-constant components AC.

Temporal Prediction Mode PM:

With compression methods a temporal prediction can be used to increase the compression rate. Temporal predictions of this kind are known to a person skilled in the art as the INTRA prediction mode INTRA, INTER prediction mode INTER and RESIDUAL prediction mode RES, for example from Shi and Sun, "Image and video compression for multimedia engineering", CRC-Press, 2000 or ITU-T and ISO/IEC JTC1, "JSVM 1 Software", JVT-N024, January 2005, so their mode of operation will not be discussed further. Thus for example the coefficient X is encoded by the INTER prediction mode. When determining the optimum correction value KW the inter prediction mode is selected as the characteristic parameter P.

In the following example an optimum correction value KW is allocated respectively on the basis of three characteristic parameters P.

| PM | FW | BG | KW |
|---|---|---|---|
| INTRA | DC | 4 × 4 | 0.43 |
| INTRA | AC | 4 × 4 | 0.27 |
| INTRA | AC | 16 × 16 | 0.33 |
| INTER | DC | 4 × 4 | 0.12 |
| INTER | AC | 4 × 4 | 0.22 |
| INTER | AC | 16 × 16 | 0.55 |
| RES | DC | 4 × 4 | 0.05 |
| RES | AC | 4 × 4 | 0.30 |

This table with correction values KW indicates that for example a quantized coefficient Z, which has been encoded with the characteristic parameters P "INTRA AC 16×16", is inversely quantized with the correction value KW=0.33. If no corresponding entry is found in this table for a quantized coefficient Z, the combination of characteristic parameters P which comes closest to the characteristic parameters P of the quantized coefficient Z is selected from the table. If the quantized coefficient Z has been encoded for example with "INTER AC 4×8", the combination "INTER AC 4×4", which comes closest to "INTER AC 4×8", could be selected and the correction value determined as KW=0.22.

It may also be expedient for a characteristic parameter P, for example the temporal prediction mode PM, to not be used alone but only in combination with a further characteristic parameter P, for example the block size BG.

In the previous examples the correction value KW has been used in inverse quantization in the decoding unit. Many compression methods, such as video decoding standard MPEG-4, decode the encoded image data to be able to have recourse to preceding images within the framework of the INTER prediction mode. In this case inverse quantization of the quantized coefficient Z is also carried out. The method can also be used in this case but it should be ensured that the encoding unit and the decoding unit use the same correction value KW in inverse quantization of a specific quantized coefficient Z. Otherwise encoding unit and decoding unit do not operate synchronously and the compression method provides incorrectly decoded images IM'.

The formation of the coefficient group G will be described in more detail hereinafter. In the exemplary embodiment according to FIG. 3 the image IM is firstly completely encoded. One or more coefficient group(s) G are then formed, each coefficient group G considering quantized coefficients Zn with at least one characteristic parameter P. Thus for example all quantized coefficients with the quantization factor Q=5 are combined to form a coefficient group G and the quantization error QF is minimized or an optimum correction value KW is determined for this coefficient group G. Instead of considering all quantized coefficients only specific quantized coefficients may be considered for forming one or more coefficient group(s) G. The quantized coefficients Zn of at least one image block BB, and/or at least one group GOB of image blocks and/or at least one image IM can therefore be considered.

In practice it may also be expedient to recreate at least one coefficient group G during execution of a compression method and to minimize the quantization error QF or calculate one or more optimized correction value(s) KW for this recreated coefficient group G. An instant at which this is carried out depends for example on a plurality of already quantized coefficients Z or is carried out at strictly predefined instants TO.

In an alternative embodiment of the method an estimator SF is used for selection of the correction value KW. This estimator SF has the function of making it possible to obtain a correction value KW from this estimator SF. For example an estimator SF for the characteristic parameter P block size BG with the sizes 4×4, 8×8 and 16×16 should be used for the video compression method H.264. To determine this estimator SF coding takes place offline, for example using one or more test sequence(s) with block sizes BG of 4×4, 8×8 and 16×16, and a coefficient group G is formed for each of these block sizes from the quantized coefficients Z of these test sequences. The optimum correction value KW is then determined for each of these coefficient groups G, for example KW(BG=4×4)=0.7, KW(BG=8×8)=0.5 and KW(BG=16×16)=02. The estimator SF therefore reproduces associated optimum correction values KW at the positions BG=4×4, BG=8×8 and BG=16×16. This estimator SF is stored in the encoding and/or decoding unit and can be used for encoding and/or decoding to select a correction value KW when carrying out a compression method. It is advantageous in this connection that the estimator SF can be determined offline. Use of the estimator SF is also advantageous since, compared with the exemplary embodiments according to FIG. 3 and FIG. 5, transmission of the corrections value(s) KW can be omitted as both the encoding and decoding units can obtain the correction value KW from the estimator SF.

Figure 7:
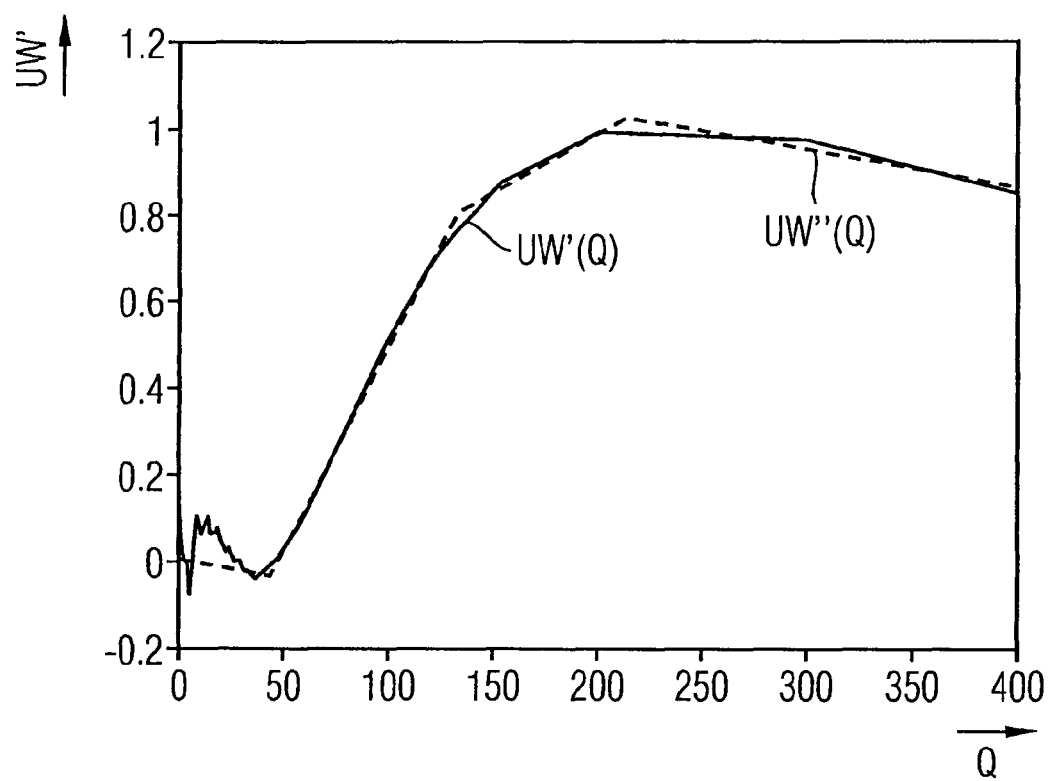
FIG. 7 shows a graph of standardized differentials as a function of quantization factors.

The estimator SF can also be formed as a function of a plurality of characteristic parameters P. In addition to determining the estimator SF by calculation a statistical function, for example a Laplace function, can also be used which constitutes an approximation for an estimator determined by calculation. FIG. 4 shows an estimator SF(Q) as a function of the quantization factor Q. This estimator SF(Q) differs in FIG. 4 from the optimum correction values KW in the case of larger quantization factors Q. For this purpose, according to an extension of the method a differential UW can be formed which characterizes this difference, for example UW=SF−KW. FIG. 7 shows a function of differentials UW as a function of the quantization factor Q. This is identified by the reference characters UW'(Q). The maximum differential is represented as standardized to zero in this case. This differential UW, or a function with differentials, can be transmitted from the encoding unit to the decoding unit and is then taken into consideration in inverse quantization, as for example with a specific quantization factor Q it follows that Y=(Z+SF−UW)*Q. In the example according to FIGS. 3 and 5 the differential UW is stored in the first data JDS1. In the example of FIG. 3 the estimator SF and/or the differential UW can be determined in the correction value unit KWE. In the exemplary embodiment of FIG. 5 the estimator SF and/or the differential UW can be processed with the aid of the correction value analysis unit KWA.

A larger data set has to be transmitted or filed for transmitting and storing the estimator SF and/or the function of the differentials UW. This can take place for example in table form. To reduce this data set a piece-wise linearization of the estimator and/or the function of the differentials can be carried out before transmission or storage. This is reproduced in FIG. 7 by the by the broken-line function, identified by UW"(Q). Determination of the piece-wise linearization or other methods of linearization can be found for example in Chapters 3 and 4 of document Prof. Dr.-Ing. E. Schrüfer, "Signal-verarbeitung", $2^{nd}$ edition, 1992, Hanser Verlag, ISBN 3-446-16563.

Positive values have been used for the coefficients X or quantized coefficients Z in the previous exemplary embodiments. The method can be used with positive and negative values. The correction value KW can also assume a positive or negative value.

The method has been described using FIGS. 3 and 5. In general FIG. 5 represents an encoding unit JC which instead of an image encoding process, such as JPEG, can also implement other compression methods such as a video encoding method or an audio encoding method. If the encoding unit EC constitutes a device encoding method the block size BG, at least one frequency value FW or/and the temporal prediction mode PM can be considered as a characteristic parameter P instead of or in addition to the quantization factor Q. This is shown in FIG. 3 by broken lines. This analogously applies to FIG. 5, the reference character JD generally representing a decoding unit of a compression method.

Figure 8:
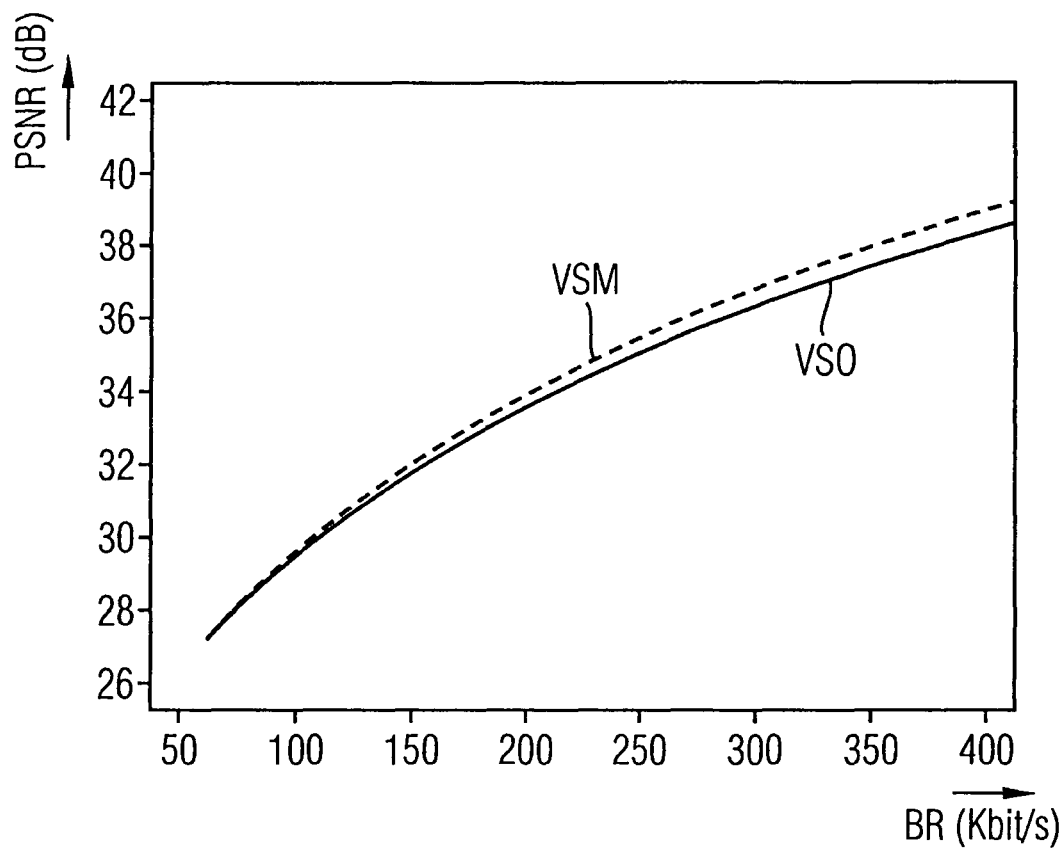
FIG. 8 shows a graph of a respective image quality of two encoded video signals.

FIG. 8 shows an image quality PSNR(dB) of the encoded video sequence as a function of a bit rate BR or an encoded video sequence in kilobits per second—kbit/s. The image quality PSNR(dB) is measured in the form of the error measure PSNR (PSNR=Peak-Signal-Noise-Ratio) known in video encoding. The higher the PSNR value, the better the image quality. The function with the solid line represents an encoded video signal VSO of a video sequence without using the method. The function with the broken lines shows an optimized, encoded video signal VSM of the same video sequence as the encoded video signal VSO, the method having been used. Since the optimized, encoded video signal VSM lies above the encoded video signal VSO, the optimized, encoded video signal VSM exhibits improved image quality at the same data rate BR. This improvement increases at higher data rates hereby.

Figure 9:
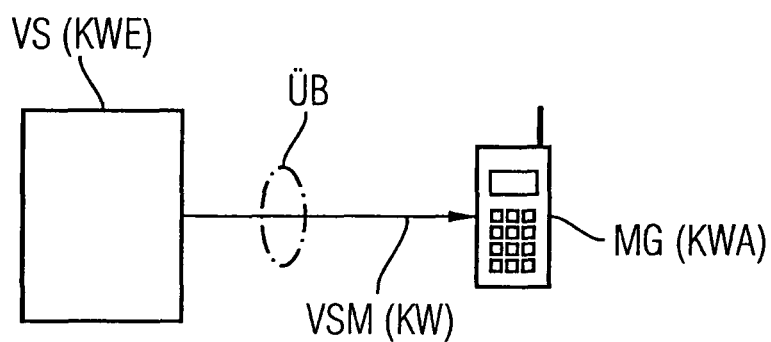
FIG. 9 shows a system with video server and a portable terminal for carrying out the proposed method.

FIG. 9 shows a video streaming system which comprises a video server VS and a portable terminal MG, in particular according to the GSM standard (GSM—Global System for Mobile Communications). Apart from a compression algorithm the video server VS uses the method when creating the optimized, encoded video signal VSM, the method being carried out by the correction value unit KWE. The optimized, encoded video signal VSM comprises one or more correction value(s) in addition to compressed image data. The optimized, encoded video signal VSM is transmitted via a transmission channel ÜB to the portable terminal MG. This transmission channel ÜB is transmitted for example by a wired network, in particular by the LAN standard (LAN—Local Area Network) or by a wireless network, in particular by the WLAN standard (WLAN—Wireless Local Area Network) or the UMTS standard (UMTS—Universal Mobile Telecommunications System). The portable terminal MG decodes the received, optimized, encoded video signal VSM and uses the correction value analysis unit KWA to implement the method.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for reducing a quantization error that occurs in an inverse quantization of a quantized coefficient to produce a pre-quantized coefficient, the pre-quantized coefficient being quantized as part of a compressing method, the quantization error describing a difference between the quantized coefficient and the pre-quantized coefficient, comprising:
   configuring a device to consider a characteristic parameter other than a parameter identifying a temporal prediction mode, the characteristic parameter being characteristic of the compression method;
   selecting a correction value as a function of the characteristic parameter; and
   adding the correction value to the quantized coefficient before performing inverse quantization, wherein
   during compression data is divided into blocks,
   a plurality of pre-quantized coefficients are determined for each block, which pre-quantized coefficients are in-turn quantized to produce quantized coefficients associated with the block,
   the block has a block size, and
   the block size is used as the characteristic parameter for each of the quantized coefficients located in the block.

2. The method as claimed in claim 1, wherein
   there are a plurality of characteristic parameters, and
   the quantized coefficient is one of the characteristic parameters.

3. The method as claimed in claim 1, wherein
   the quantized coefficient is calculated from at least a quantization factor and the pre-quantized coefficient,
   there are a plurality of characteristic parameters, and
   the quantization factor is one of the characteristic parameters.

4. The method as claimed in claim 1,
   the quantized coefficient represents an amplitude of a frequency value,
   there are a plurality of characteristic parameters, and
   the frequency value is used as one of the characteristic parameters.

5. The method as claimed in claim 1, wherein
   the temporal prediction mode is selected from the group consisting of an INTRA prediction mode, an INTER prediction mode and a RESIDUAL prediction mode,
   there are a plurality of characteristic parameters, and
   the temporal prediction mode is used as one of the characteristic parameters.

6. The method as claimed in claim 1, wherein
   there are a plurality of characteristic parameters,
   information from a test sequence is used to obtain an estimator that is associated with an estimator-linked characteristic parameter, and
   the estimator-linked characteristic parameter and the estimator are used in selecting the correction value.

7. The method as claimed in claim 6, different estimators are associated with different estimator-linked characteristic parameters.

8. The method as claimed in claim 6, wherein a Laplace function is used to produce the estimator.

9. The method as claimed in claim 6, wherein
   the correction value has a different value from the estimator,
   a differential is produced from the correction value and the estimator, and
   the differential is transmitted from an encoding device of the compression method to a decoding device of the compression method.

10. The method as claimed in claim 9, wherein
    a plurality of correction values or differentials is transmitted from the encoding device of the compression method to the decoding device of the compression method.

11. The method as claimed in claim 9, wherein before transmission, piece-wise linearization of the correction value and/or differentials is carried out as a function of the at least one characteristic parameter.

12. The method as claimed in claim 1, wherein
    a coefficient group of quantized coefficients is formed using a same characteristic parameter,
    a correction value is determined for the quantized coefficients of the coefficient group, and
    inverse quantization takes place after the correction value has been added to each quantized coefficient of the coefficient group.

13. The method as claimed in claim 12, wherein a coefficient group is recreated at an instant, this instant being determined by strictly predefined instants or a number of already quantized coefficients.

14. The method as claimed in claim 12, wherein
    the compression method is a video encoding method that compresses an image,
    coefficient groups are formed respectively for image blocks of the image.

15. The method as claimed in claim 1, the compression method is a video encoding method according to an H.264 standard.

16. A device to reduce a quantization error that occurs in an inverse quantization of a quantized coefficient to produce a pre-quantized coefficient, pre-quantized coefficient being quantized as part of a compression method, the quantization error describing a difference between the quantized coefficient and the pre-quantized coefficient, comprising:
    a storage to receive a characteristic parameter other than a temporal prediction mode parameter, the characteristic parameter being characteristic of the compression method;
    a correction value analysis unit to select a correction value as a function of the characteristic parameter; and
    an adder to add the correction value to the quantized coefficient before performing inverse quantization, wherein
    during compression data is divided into blocks,
    a plurality of pre-quantized coefficients are determined for each block, which pre-quantized coefficients are in-turn quantized to produce quantized coefficients associated with the block, the block has a block size, and
the block size is used as the characteristic parameter for each of the quantized coefficients located in the block.

17. The device as claimed in claim 16, wherein
a coefficient group of quantized coefficients is formed using a same characteristic parameter,
the correction value analysis unit selects a single correction value for the coefficient group, and
inverse quantization takes place after the single correction value has been added to each quantized coefficient of the coefficient group.

\* \* \* \* \*